(12) United States Patent
Kulkarni et al.

(10) Patent No.: US 8,489,553 B2
(45) Date of Patent: *Jul. 16, 2013

(54) MANAGING STORAGE OF INDIVIDUALLY ACCESSIBLE DATA UNITS

(75) Inventors: Vrishal Kulkarni, Waltham, MA (US);
Stephen Schmidt, Medford, MA (US);
Craig W. Stanfill, Lincoln, MA (US);
Ephraim Meriwether Vishniac,
Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,125

(22) Filed: Jul. 2, 2012

(65) Prior Publication Data

US 2012/0271862 A1    Oct. 25, 2012

Related U.S. Application Data

(63) Continuation of application No. 12/983,375, filed on Jan. 3, 2011, now Pat. No. 8,214,331, which is a continuation of application No. 12/721,214, filed on Mar. 10, 2010, now Pat. No. 7,885,932, which is a continuation-in-part of application No. 11/555,458, filed on Nov. 1, 2006, now Pat. No. 8,229,902.

(51) Int. Cl.
*G06F 17/30* (2006.01)
(52) U.S. Cl.
USPC ............................. 707/640; 707/706; 707/802
(58) Field of Classification Search
USPC ........... 707/706, 640, 802, 999.204; 711/161, 711/162
See application file for complete search history.

(56) References Cited

U.S. PATENT DOCUMENTS 4,775,932 A    10/1988    Oxley et al.
5,659,733 A     8/1997    Yamashita
(Continued)

FOREIGN PATENT DOCUMENTS

JP    63-037425    2/1988
JP    64-058018    3/1989
(Continued)

OTHER PUBLICATIONS

Japanese Office Action, with English Translation, JP Application No. 2009-535408, Aug. 8, 2012, 6 pages.

(Continued)

*Primary Examiner* — Robert W. Beausoliel, Jr.
*Assistant Examiner* — Noosha Arjomandi
(74) *Attorney, Agent, or Firm* — Fish & Richardson P.C.

(57) ABSTRACT

Managing data by: receiving a group of individually accessible data units, each data unit identified by a key value, with key values determined such that the key value identifying a first data unit received before a second data unit occurs earlier in a sort order than the key value identifying the second data unit; and processing the data units for storage in a data storage system. The processing includes: storing blocks of data, the blocks being generated by combining a plurality of the data units; providing an index with entries that enable location, based on a provided key value, of a block that includes a data unit corresponding to the provided key value; and generating one or more screening data structures associated with the blocks for determining, based on a given key value, whether to search the stored blocks for a data unit corresponding to the given key value.

45 Claims, 10 Drawing Sheets

U.S. PATENT DOCUMENTS

| | | | |
|---|---|---|---|
| 5,737,593 A * | 4/1998 | Agrawal et al. | 1/1 |
| 6,278,992 B1 | 8/2001 | Curtis et al. | |
| 6,510,425 B1 | 1/2003 | Okamoto et al. | |
| 6,873,993 B2 | 3/2005 | Charlesworth et al. | |
| 6,970,866 B1 | 11/2005 | Pravetz et al. | |
| 6,996,573 B2 * | 2/2006 | Syvanne | 1/1 |
| 7,885,932 B2 | 2/2011 | Kulkarni et al. | |
| 8,214,331 B2 | 7/2012 | Kulkarni et al. | |
| 8,229,902 B2 | 7/2012 | Vishniac et al. | |
| 2002/0052870 A1 * | 5/2002 | Charlesworth et al. | 707/3 |
| 2002/0073096 A1 | 6/2002 | Shaath et al. | |
| 2004/0049485 A1 | 3/2004 | Obermaier et al. | |
| 2004/0236743 A1 * | 11/2004 | Blaicher et al. | 707/7 |
| 2006/0184563 A1 | 8/2006 | Potter | |
| 2007/0005598 A1 | 1/2007 | Okamoto et al. | |
| 2008/0015945 A1 | 1/2008 | Goldstein | |
| 2008/0104149 A1 | 5/2008 | Vishniac et al. | |
| 2009/0248645 A1 | 10/2009 | Ogura | |
| 2009/0287986 A1 | 11/2009 | Vishniac et al. | |

FOREIGN PATENT DOCUMENTS

| | | |
|---|---|---|
| JP | 05-257774 | 10/1993 |
| JP | 07-287716 | 10/1995 |
| WO | WO2008/043082 | 4/2008 |

OTHER PUBLICATIONS

Chen, Z., et al., "Query Optimization in Compressed Database Systems" *ACM SIGMOD* May 21-24, 2001, Santa Barbara, California, USA.

Comer, Douglas, "The Ubiquitous B-Tree." *Computing Surveys*, vol. 11, No. 2, Jun. 1979, pp. 121-137.

International Search Report and Written Opinion issued in PCT application No. PCT/US2010/026817, dated May 10, 2010, 13 pages.

Chinese Office Action (English translation) issued in CN application No. 200780040946.9, dated Mar. 30, 2011, 7 pages.

Stanfill, Craig. "Massively Parallel Information Retrieval for Wide Area Information Servers," Systems, Man, and Cybernetics, 1991. Decision Aiding for Complex Systems, Conference Proceeding, 1991 IEEE International Conference, Oct. 13-16, 1991, vol. 1, pp. 679-682.

Xiukun, Wang et al., "Machine translation dictionary based on Hash method," English Translation included. Journal of Dalian University of Technology, vol. 36, No. 3, May 1996, 10 pages.

International Search Report and Written Opinion, PCT/US2012/045759, Oct. 2, 2012, 11 pages.

* cited by examiner

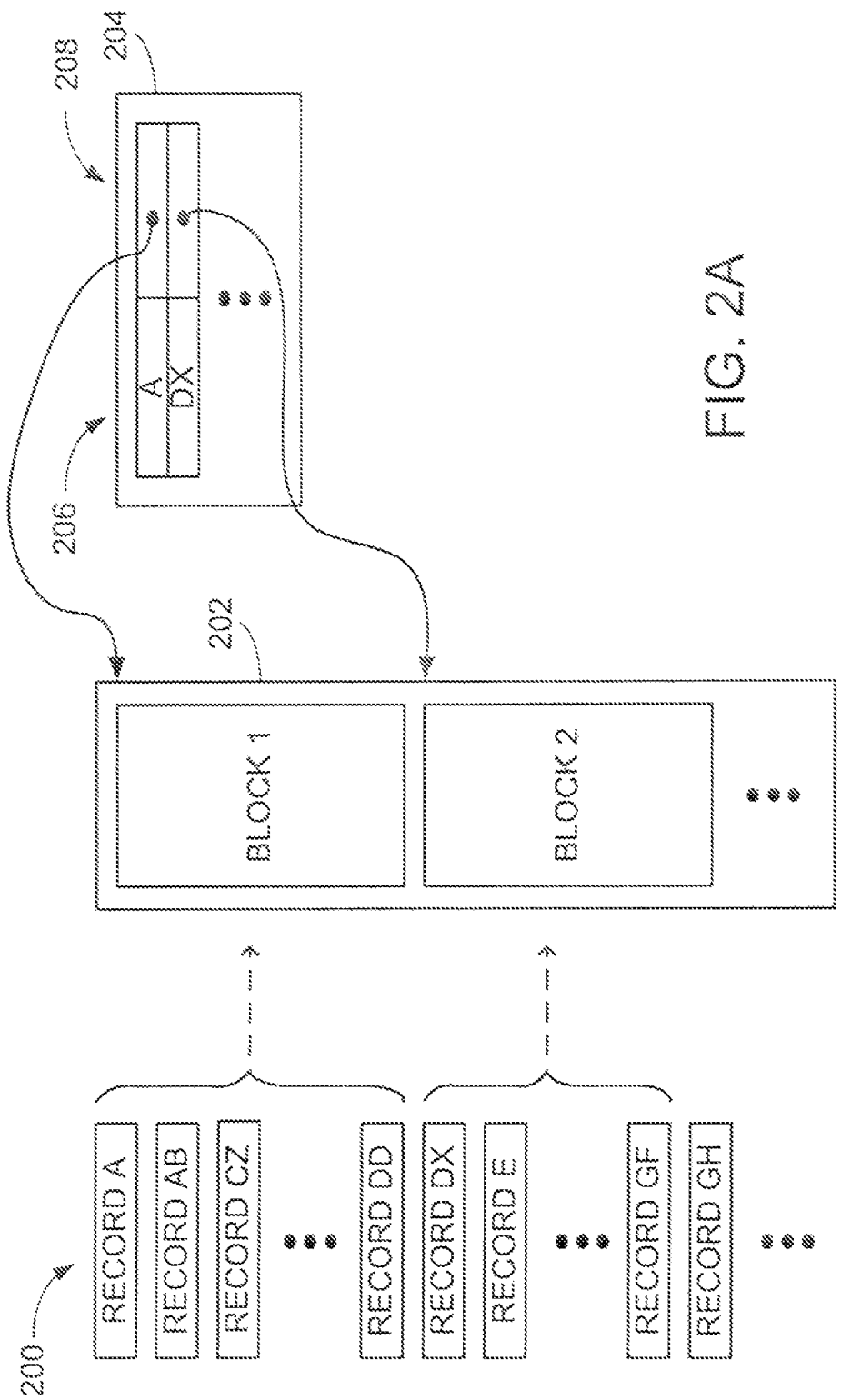

US 8,489,553 B2

MANAGING STORAGE OF INDIVIDUALLY ACCESSIBLE DATA UNITS

CROSS-REFERENCE TO RELATED APPLICATIONS

This application is a continuation of and claims priority to U.S. application Ser. No. 12/983,375, filed on Jan. 3, 2011 (U.S. Pat. No. 8,214,331 to be issued on Jul. 3, 2012), which is a continuation of and claims priority to U.S. application Ser. No. 12/721,214, filed on Mar. 10, 2010, which is a continuation-in-part application of and claims priority to U.S. application Ser. No. 11/555,458, filed on Nov. 1, 2006, each of which is incorporated herein by reference.

BACKGROUND

The invention relates to managing storage of individually accessible data units.

A database system can store individually accessible unit of data or "records" in any of a variety of formats. Each record may correspond to a logical entity such as a credit card transaction and typically has an associated primary key used to uniquely identify the record. The record can include multiple values associated with respective fields of a record format. The records can be stored within one or more files (e.g., flat files or structured data files such as XML files). In compressed database systems individual records or values within records may be compressed when stored and decompressed when accessed to reduce the storage requirements of the system.

SUMMARY

In one aspect, in general, a method for managing data includes: receiving at least one group of individually accessible data units over an input device or port, each data unit identified by a key value, with key values of the received data units being sorted such that the key value identifying a given first data unit that is received before a given second data unit occurs earlier in a sort order than the key value identifying the given second data unit; and processing the data units for storage in a data storage system. The processing includes: storing a plurality of blocks of data, each of one or more of the blocks being generated by combining a plurality of the data units; providing an index that includes an entry for each of the blocks, wherein one or more of the entries enable location, based on a provided key value, of a block that includes data units corresponding to a range of key values that includes the provided key value; and generating one or more screening data structures associated with the stored blocks for determining a possibility that a data unit that includes a given key value was included in the group of individually accessible data units.

Aspects can include one or more of the following features.

Generating one or more screening data structures includes generating a plurality of screening data structures including a first screening data structure for screening a first set of one or more blocks and a second screening data structure for screening a second set of one or more blocks.

All of the data units included in the second set of one or more blocks have key values that occur later in the sort order than any of the key values of the data units included in the first set of one or more blocks.

Each of the plurality of screening data structures corresponds to a different non-overlapping range of key values identifying data units stored in a corresponding set of one or more blocks.

The first screening data structure is generated after accumulating a predetermined number of distinct key values of a first set of data units stored in the first set of one or more blocks, and the second screening data structure is generated while receiving a second set of data units stored in the second set of one or more blocks.

The method further includes searching for a data unit with a given key value using the index and the plurality of screening data structures.

The searching includes checking each of multiple screening data structures for a positive result indicating that a data unit with the given key value is possibly included in the group of individually accessible data units.

The method further includes, in response to a positive result for a corresponding screening data structure, searching the index to determine whether the given key value falls within a range of key values spanning one or more blocks that are screened by the corresponding screening data structure.

The method further includes, in response to the given key value falling within the range of key values spanning multiple blocks that are screened by the corresponding screening data structure, searching the index to find a specific block to search for a data unit with the given key value.

Generating one or more screening data structures includes generating a single screening data structure for screening all of the blocks storing the data units in the group of individually accessible data units after determining that there are fewer than a predetermined number of distinct keys of the data units in the group of individually accessible data units.

The single screening data structure is generated from a selected one of multiple screening data structures generated in parallel while receiving at least some of the data units in the group of individually accessible data units.

A given screening data structure determines, for a given key value, either that a data unit including the given key value was definitely not included, or that a data unit including the given key value was possibly included.

The probability that the given screening data structure determines that a data unit including the given key value was possibly included when the data unit was not included depends on the size of the data structure.

The method further includes selecting the size of the given screening data structure based on the number of distinct key values identifying the data units from which the blocks were generated.

A key value that identifies a given data unit corresponds to one or more fields associated with the given data unit before the given data unit is received over the input device or port.

The method further includes accumulating distinct key values as the data units are received and counting the accumulated distinct key values after the data units in the group of individually accessible data units are received.

A key value that identifies a given data unit is assigned to the given data unit after the given data unit is received over the input device or port.

The key values are assigned monotonically.

All the assigned key values are distinct.

The number of screening data structures associated with the stored blocks is based on the number of distinct key values identifying the data units in the group of individually accessible data units and a target false positive probability associated with the screening data structures.

The index is a hierarchical index including at least a first level of the index and a second level of the index.

The first level of the index is divided into multiple regions of the entries that enable location, based on a provided key value, of a block that includes data units corresponding to a range of key values that includes the provided key value, with each region being small enough to fit entirely within a memory coupled to the data storage system.

One or more of the entries in the index identify a range of key values corresponding to data units from which a corresponding block was generated.

Each of at least some of the entries in the index identifies a storage location of the corresponding block.

The second level of the index is small enough to fit entirely within the memory.

The second level of the index includes a respective entry for each of the multiple regions.

One or more of the entries in the second level of the index enable location, based on a provided key value, of a region of the first level of the index that includes entries corresponding to a range of key values that includes the provided key value.

In another aspect, in general, a computer-readable medium stores a computer program for managing data, the computer program including instructions for causing a computer to: receive at least one group of individually accessible data units over an input device or port, each data unit identified by a key value, with key values of the received data units being sorted such that the key value identifying a given first data unit that is received before a given second data unit occurs earlier in a sort order than the key value identifying the given second data unit; and process the data units for storage in a data storage system. The processing includes: storing a plurality of blocks of data, each of one or more of the blocks being generated by combining a plurality of the data units; providing an index that includes an entry for each of the blocks, wherein one or more of the entries enable location, based on a provided key value, of a block that includes data units corresponding to a range of key values that includes the provided key value; and generating one or more screening data structures associated with the stored blocks for determining a possibility that a data unit that includes a given key value was included in the group of individually accessible data units.

In another aspect, in general, a system for managing data includes: an input device or port configured to receive at least one group of individually accessible data units, each data unit identified by a key value, with key values of the received data units being sorted such that the key value identifying a given first data unit that is received before a given second data unit occurs earlier in a sort order than the key value identifying the given second data unit; and at least one processor configured to process the data units for storage in a data storage system. The processing includes: storing a plurality of blocks of data, each of one or more of the blocks being generated by combining a plurality of the data units; providing an index that includes an entry for each of the blocks, wherein one or more of the entries enable location, based on a provided key value, of a block that includes data units corresponding to a range of key values that includes the provided key value; and generating one or more screening data structures associated with the stored blocks for determining a possibility that a data unit that includes a given key value was included in the group of individually accessible data units.

In another aspect, in general, a system for managing data includes: means for receiving at least one group of individually accessible data units, each data unit identified by a key value, with key values of the received data units being sorted such that the key value identifying a given first data unit that is received before a given second data unit occurs earlier in a sort order than the key value identifying the given second data unit; and means for processing the data units for storage in a data storage system. The processing includes: storing a plurality of blocks of data, each of one or more of the blocks being generated by combining a plurality of the data units; providing an index that includes an entry for each of the blocks, wherein one or more of the entries enable location, based on a provided key value, of a block that includes data units corresponding to a range of key values that includes the provided key value; and generating one or more screening data structures associated with the stored blocks for determining a possibility that a data unit that includes a given key value was included in the group of individually accessible data units.

Aspects can include one or more of the following advantages.

By compressing a block of multiple records, a greater degree of compression can be achieved than by compressing the records individually. The indexed blocks provide the ability to access a given record without requiring decompression from the beginning of a file of compressed records. The size of the blocks can be selected to be large enough to provide high compression and small enough to limit the amount of decompression necessary to access a given record within a block. Each block can be compressed using a compression technique that does not need to provide the ability to start decompression from an arbitrary location within the compressed block. Thus, techniques that provide a large degree of compression can be used.

By storing an index that identifies a range of key values corresponding to records from which a corresponding block was generated, the index can remain small (e.g., small enough to fit in a relatively fast memory) since it does not need to have an entry for each record. The index entries enable location of one or more blocks that can be loaded and decompressed to recover a set of records that can be searched for a desired record. Associating screening data structures (e.g., overlap encoded signatures or other types of bitmaps) with compressed blocks can indicate that a desired record is not present obviating the need to load and decompress the compressed block to search for the record. An adaptive technique can be used for incrementally generating screening data structures in a way that does not use excessive storage space. Various techniques can be used to avoid excessive increase in the probability of false positives that would otherwise be caused by checking many different screening data structures. For searching a potentially large index, a hierarchical technique for generating the index speeds the index search by reducing the number of times a relatively slower non-local storage needs to be accessed.

Other features and advantages will become apparent from the following description, and from the claims.

DESCRIPTION OF DRAWINGS

FIGS. 2A, 2B, 2C, and 2D are schematic diagrams of data processed by and stored in the system.

DESCRIPTION

Figure 1:
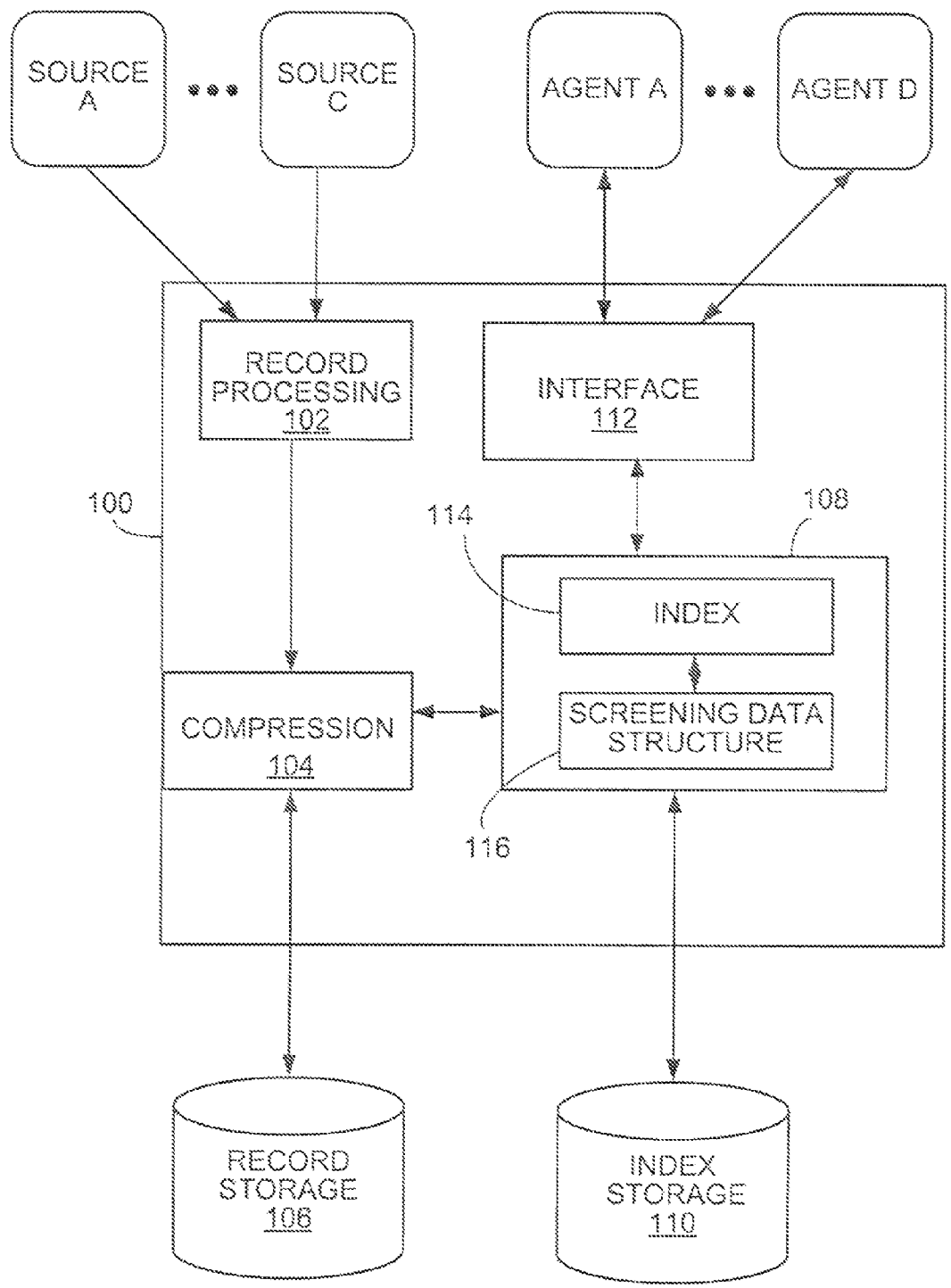
FIG. 1 is a block diagram of a system for storing and retrieving records.

Referring to FIG. 1, a record storage and retrieval system 100 accepts data from one or more sources, such as SOURCE A-SOURCE C. The data include information that can be represented as individually accessible units of data. For example, a credit card company may receive data representing individual transactions from various retail companies. Each transaction is associated with values representing attributes such as a customer name, a date, a purchase amount, etc. A record processing module 102 ensures that the data is formatted according to a predetermined record format so that the values associated with a transaction are stored in a record. In some cases this may include transforming the data from the sources according to the record format. In other cases, one or more sources may provide the data already formatted according to the record format.

The record processing module 102 sorts the records by a primary key value that identifies each record (e.g., either a unique key identifying a single record, or a key that identifies multiple updated versions of a record), and divides the records into sets of records that correspond to non-overlapping ranges of primary key values. For example, each set of records may correspond to a predetermined number of records (e.g., 100 records). A compression module 104 compresses each set of records into a compressed block of data. These compressed blocks are stored in a compressed record file in a record storage 106 (e.g., a non-volatile storage medium such as one or more hard disk drives). The system 100 also includes an indexing and search module 108 that provides an index 114 that includes an entry for each of the blocks. The index 114 is used to locate a block that may include a given record, as described in more detail below. The indexing and search module 108 also includes a screening data structure 116 that is used to determine when it may be necessary to search the record storage 106 for a given record, as described in more detail below. The index 114 and screening data structure 116 can be stored in the same storage medium as the compressed record file, or in some implementations, at least a portion of the index 114 and screening data structure 116 may preferably be stored in a relatively faster local storage accessible by the module 108 (e.g., a volatile storage medium such as a Dynamic Random Access Memory) since the index file is typically much smaller than the compressed record file. In these implementations, remaining portions of the index 114 and/or screening data structure 116 may be stored in an index storage 110 (e.g., a non-volatile storage medium such as one or more hard disk drives) until they are needed and moved into the local storage of the module 108. The record storage 106 and index storage 110 can be hosted on the same storage media or on different storage media.

In alternative implementations of the system 100, the sets of records can be processed to generate blocks using other functions in addition to or instead of compression to combine the records in some way (i.e., so that the block is not merely a concatenated set of records). For example, some systems may process a set of records to generate blocks of encrypted data.

An interface module 112 provides access to the stored records to human and/or computer agents, such as AGENT A-AGENT D. For example, the interface module 112 can implement an online account system for credit card customers to monitor their transactions. A request for transaction information meeting various criteria can be processed by the system 100 and corresponding records can be retrieved from within compressed blocks stored in the record storage 106.

A stream of incoming records from one or more sources may be temporarily stored before being processed to generate a compressed record file. Referring to FIG. 2A, the system 100 receives a set of records 200 to be stored in a compressed record file, and sorts the records according to values of a primary key.

A primary key value can uniquely identify a given item in a database that may be represented by one or more records (e.g., each record having a given primary key value may correspond to a different updated version of the item). The primary key can be a "natural key" that corresponds to one or more existing fields of a record. If there is no field that is guaranteed to be unique for each item, the primary key may be a compound key comprising multiple fields of a record that together are guaranteed or highly likely to be unique for each item. Alternatively, the primary key can be a "synthetic key" which can be assigned to each record after being received. For example, the system 100 can assign unique primary key values as sequentially incremented integers, or some other sequence of monotonically progressing values (e.g., time stamps). In this case, records representing different versions of the same item may be assigned different synthetic key values. If integers are used, the range of possible primary key values (e.g., as determined by the number of bits used) can be large enough so that if the primary key rolls over, any record previously assigned a given primary key value has been removed from the compressed record file. For example, old transactions may be removed and archived or discarded.

In the example shown in FIG. 2A, the records 200 are identified by alphabetically sorted primary key values: A, AB, CZ, .... The system 100 compresses a first set of N records having primary key values A-DD to generate a corresponding compressed block labeled BLOCK 1. The next set of records includes the next N of the sorted records having primary key values DX-GF. The compression module 104 can use any of a variety of lossless data compression algorithms (e.g., Lempel-Ziv type algorithms). Each successive compressed block is combined form a compressed record file 202.

The number N of records used to generate a compressed block, can be selected to trade off between compression efficiency and decompression speed. The compression may reduce the size of the data on average by a given factor R that depends on the nature of the data being compressed and on the size of the data being compressed (e.g., R is typically smaller when more data is being compressed). The compression may also have an associated overhead (e.g., compression related data) of average size O. The average size of the resulting compressed record file generated from M records each of size X can be expressed as $[M/N](RNX+O)$, which for a large number of blocks can be approximated as $RMX+OM/N$. Thus, a larger value of N can in some cases provide greater compression both by reducing R and by reducing the contribution of the overhead to the size of the file. A smaller value of N reduces the time needed to decompress a given compressed block to access a record that may be contained in the block.

In other implementations, different compressed blocks may include different numbers of records. Each block may have a number of records according to a predetermined range. For example, the first block includes records with primary key values 1-1000, and the second block includes records with primary key values 1001-2000, etc. The number of records in the compressed blocks in this example could be different since not every primary key value necessarily exists (e.g., in the case of an existing numerical field used as a natural key).

In some implementations, different compressed blocks may include a target number of records in some cases, and in exceptional cases may include more or fewer records. For example, if a set of records ends with a record whose primary key value is different from the primary key value of the following record in the sorted order, those records are used to generate a compressed block. If the set of records ends with a record whose primary key value is the same as the primary key value of the following record in the sorted order, all the additional records having that primary key value are added to the set. In this way, the same primary key value does not cross over from one compressed block to the next.

The indexing and search module 108 generates an entry in an index file 204 for each of the compressed blocks. The index entries include a key field 206 that identifies each compressed block, for example, by the primary key of the first record in the corresponding uncompressed set of records. The entries also include a location field 208 that identifies the storage location of the identified compressed block within the compressed record file 202. For example, the location field can contain a pointer in the form of an absolute address in the record storage 106, or in the form of an offset from the address of the beginning of the compressed record file 202 in the record storage 106.

To search for a given record in the compressed record file 202, the module 108 can perform a search (e.g., a binary search) of the index file 204 based on the key field 206. For a provided key value (e.g., provided by one of the agents), the module 108 locates a block that includes records corresponding to a range of key values that includes the provided key value. The record with the provided key value may or may not have been included in the set of records used to generate the located block, but if the record existed in the records 200, that record would have been included since the records 200 were sorted by the primary key value. The module 108 then decompresses the located block and searches for a record with the provided key value. In cases in which the primary key value is not unique for each record, the module 108 may find multiple records with the provided key value in the compressed block. In this example in which the key field 206 includes the primary key of the first record in a set, the module 108 searches for two consecutive index entries that have key values earlier and later, respectively, than the provided key value, and returns the block corresponding to the entry with the earlier key value. In some cases, the provided key value may be the same as a key value in an index entry, in which case the module 108 returns the block corresponding to that entry.

In different implementations, there are different ways for the entries in the index file 204 to identify a range of key values corresponding to the records from which a corresponding block was generated. As in the implementation shown in FIG. 2A, the range of key values can be the range between the two extremum key values of the records used to generate a block (e.g., the first and last in a sorted sequence of alphabetical primary key values, or the minimum and maximum in a sorted sequence of numerical primary key values). The index entry can include either or both of the extrema that define the range. In some implementations, if the index entries include the minimum key value that defines a range for a given block, the last index entry associated with the last block in a compressed record file may also include a maximum key value that defines the range for that block. This maximum key value can then be used when searching the compressed record file to determine when a given key value is out of range.

Alternatively, the range of key values can be a range extending beyond the key values of the records used to generate a block. For example, in the case of a block generated from records with numerical primary key values between 1 and 1000, the smallest key value represented in the records may be greater than 1 and the largest key value represented in the records may be smaller than 1000. The index entry can include either or both of the extrema 1 and 1000 that define the range.

When additional records arrive after an initial group of records have been processed to generate a compressed record file, those records can be stored in a buffer and searched in uncompressed form. Alternatively, additional groups of records can be incrementally processed and stored as additional compressed record files accessible by additional index files. In some cases, even when compressing a small number of additional records may not provide a great reduction in storage size, it may still be advantageous to compress the additional records to maintain uniform procedures for accessing records. Additional records can be processed repeatedly at regular intervals of time (e.g., every 30 seconds or every 5 minutes), or after a predetermined number of additional records have been received (e.g., every 1000 records or every 10,000 records). If incoming records are processed based on time intervals, in some intervals there may be no incoming records or a small number of records that are all compressed into a single compressed block.

Figure 2B:
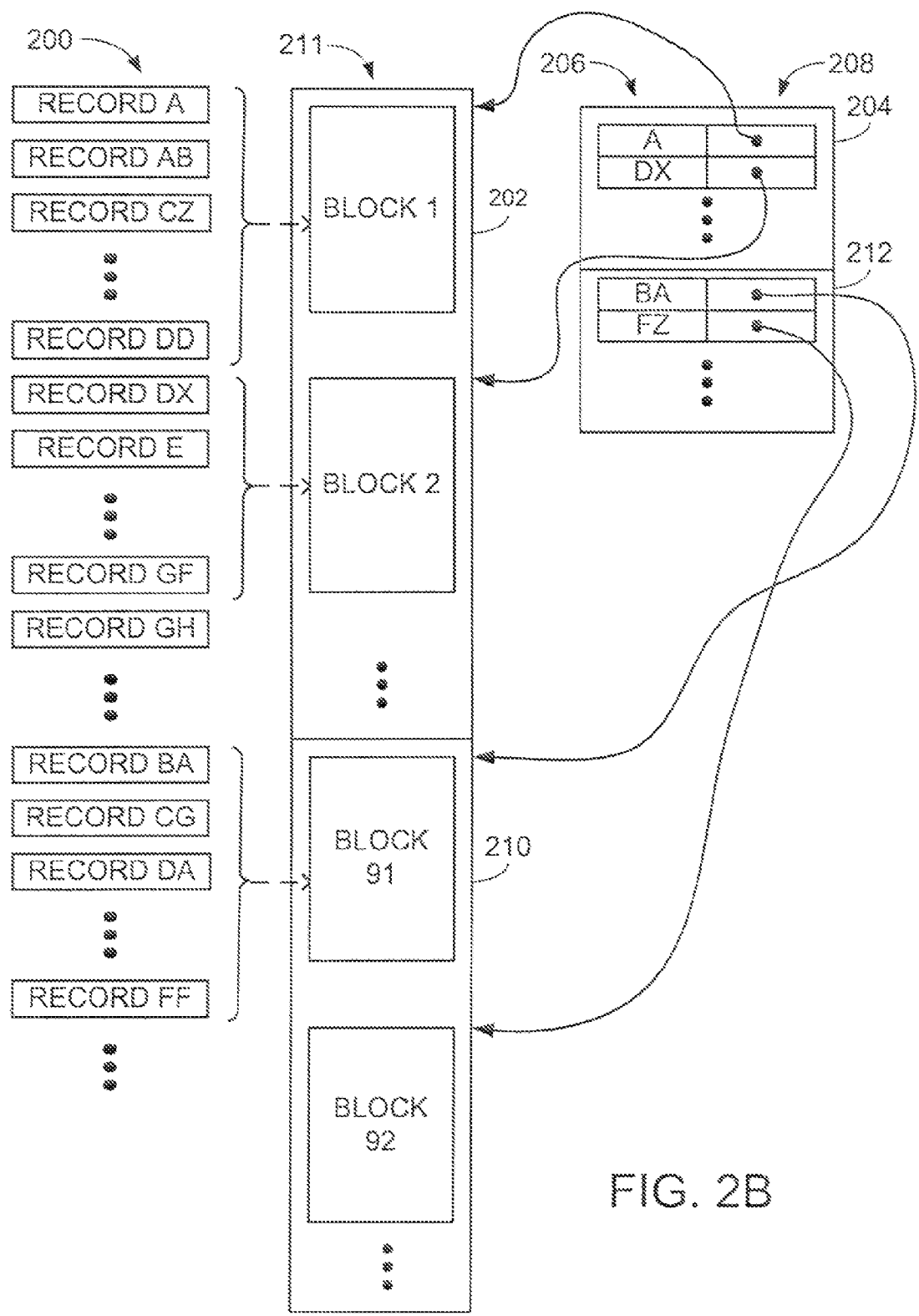

Referring to FIG. 2B, in an example in which additional records have been received by the system 100 after the initial compressed record file 202 has been generated, an additional compressed record file 210 can be appended to the initial compressed record file 202 to form a compound compressed record file 211. The system 100 sorts the additional records by primary key values and compresses sets of N records to generate compressed blocks of the compressed record file 210. The first compressed block in the appended file 210 labeled BLOCK 91 has primary key values BA-FF. The module 108 generates an additional index file 212 that includes entries that can be used to search for the additional records represented within the appended file 210. The new index file 212 can be appended to the previous index file 204.

Any number of compressed record files can be appended to form a compound compressed record file. If the indexing and search module 108 is searching for a record with a given key value within a compound compressed record file, the module 108 searches for the record within each of the appended compressed record files using the corresponding index files. Alternatively, an agent requesting a given record can specify some number of the compressed record files with a compound compressed record file to be searched (e.g., the 10 most recently generated, or any generated within the last hour).

After a given amount of time (e.g., every 24 hours) or after a given number of compressed record files have been appended, the system 100 can consolidate the files to generate a single compressed record file from a compound compressed record file and a new corresponding index file. After consolidation, a single index can be searched to locate a compressed block that may contain a given record, resulting in more efficient record access. At consolidation time, the system 100 decompresses the compressed record files to recover the corresponding sets of sorted records, sorts the records by primary key values, and generates a new compressed record file and index. Since each of the recovered sets of records is already sorted, the records can be sorted efficiently by merging the previously sorted lists according to the primary key values to generate a single set of sorted records.

Figure 2C:
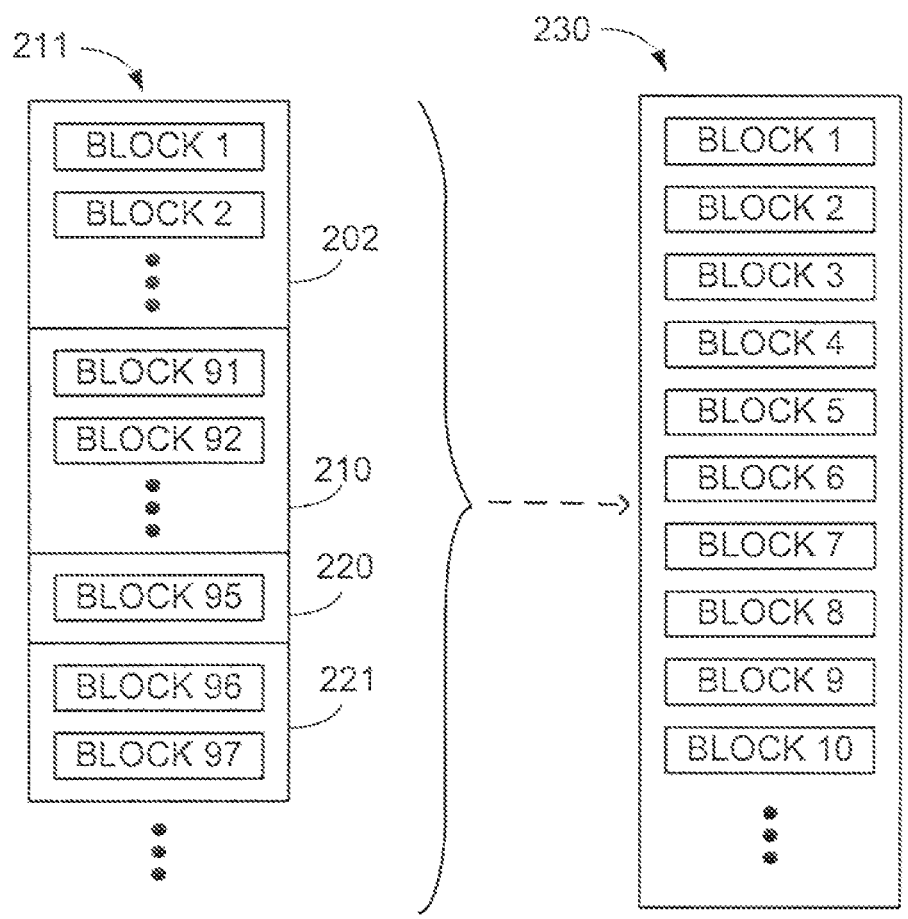

Referring to FIG. 2C, the compound compressed record file 211 includes the initial compressed record file 202, the additional compressed record file 210, and number of additional compressed record files 220, 221, ... depending on how many additional records have arrived and how often the records have been processed. Each compressed record file can have an associated index file that can be used to search for a given record in within the compressed blocks of that file. In this example, one of the compressed record files 220 is small enough to have only a single compressed block (BLOCK 95), and therefore does not necessarily need an associated index file, but can have associated data that indicates a range of primary key values in the block and its location in storage. After consolidation, the records recovered from the different appended compressed record files are processed to generate a single compressed record file 230.

Figure 2D:
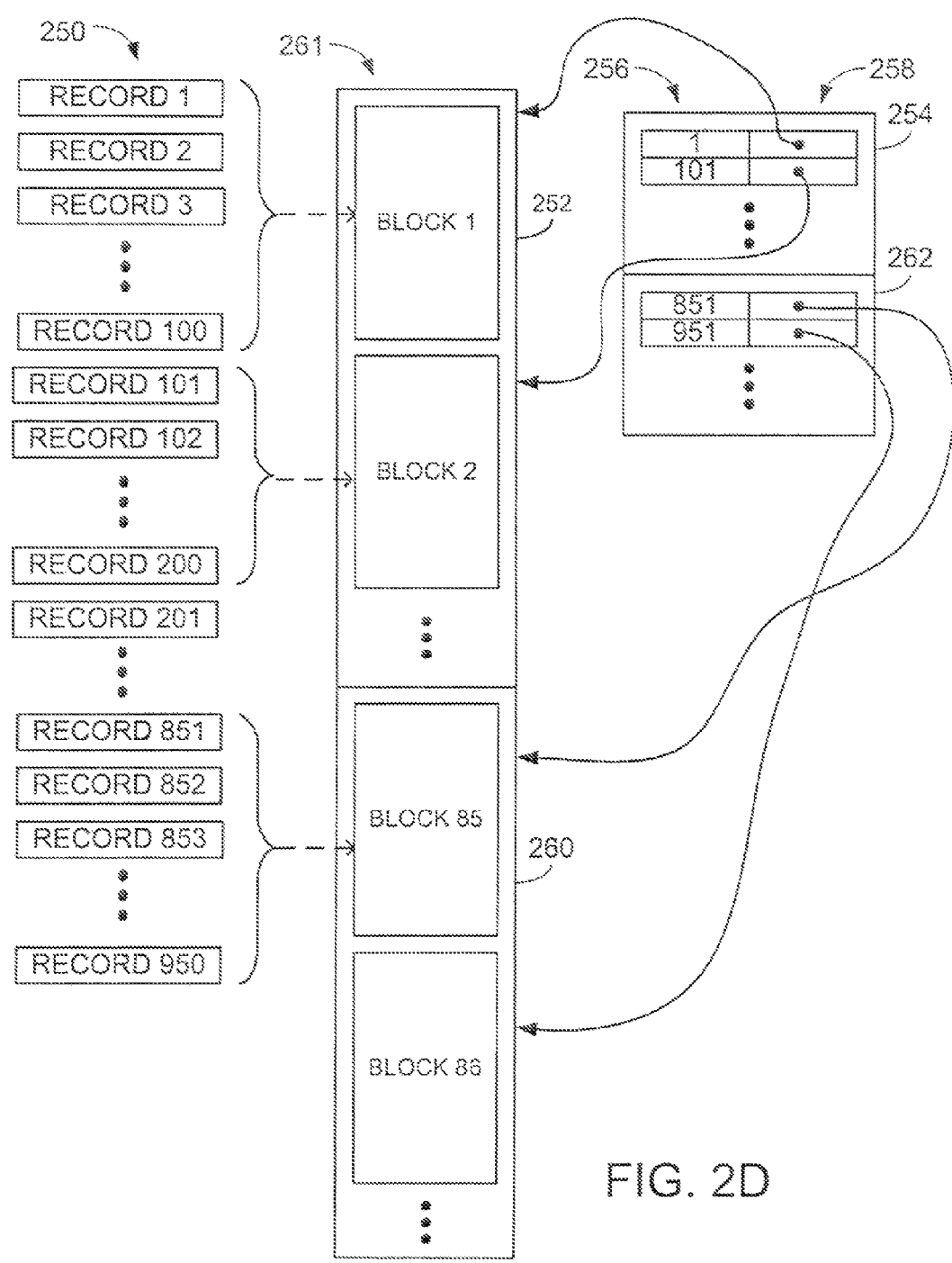

In the case of monotonically assigned primary keys, records are automatically sorted not only within compressed record files, but also from one file to the next, obviating the need to consolidate files in order to access a record in a single index search. Referring to FIG. 2D, the system 100 receives a set of records 250 that are identified by consecutive integers assigned in arrival order as primary keys for the records. Thus, the records 250 are automatically sorted by primary key. An initial compressed record file 252 includes compressed blocks each including 100 records in this example, and an index file 254 includes a key field 256 for the primary key value of the first record in a compressed block and a location field 258 that identifies the corresponding storage location. Since records that arrive after the initial compressed record file 252 has been generated will automatically have primary key values later in the sorted order, an appended compressed record file 260 and corresponding index file 262 do not need to be consolidated to enable efficient record access based on a single index search. For example, the index file 262 can simply be appended to the index file 254 and both indices can be searched together (e.g., in a single binary search) for locating a compressed block in either of the compressed record files 252 or 260.

The compound compressed record file 261 may optionally be consolidated to eliminate an incomplete block that may have been inserted at the end of the compressed record file 252. In such a consolidation, only the last compressed block in the first file 252 would need to be decompressed, and instead of merging the decompressed sets of records, the sets of records could simply be concatenated to form a new sorted set of records to be divided into sets of 100 records that are then compressed again to form a new compressed record file.

Another advantage of using a consecutive integer synthetic primary key values is that if the records are going to be partitioned based on the primary key value, the partitions can be automatically balanced since there are no gaps in the key values.

Any of a variety of techniques can be used to update records and invalidate any previous versions of the record that may exist in a compressed record file. In some cases, records don't need to be removed or updated individually (e.g., logs, transactions, telephone calls). In these cases, old records be removed and discarded or archived in groups of a predetermined number of compressed blocks, for example, from the beginning of a compressed record file. In some cases, entire compressed record files can be removed.

In some cases, one or more values of a record are updated by adding a new updated record for storage in a compressed block, and a previously received version of the record (with the same primary key value) may be left stored in a different compressed block. There could then multiple versions of a record and some technique is used to determine which is the valid version of the record. For example, the last version (most recently received) appearing in any compressed record file may be implicitly or explicitly indicated as the valid version, and any other versions are invalid. A search for a record with a given primary key in this case can include finding the last record identified by that primary key in order of appearance. Alternatively, a record can be invalidated without necessarily adding a new version of a record by writing an "invalidate record" that indicates that any previous versions of the record are not valid.

The system 100 mediates access to the compressed record files stored in the record storage 106 by different processes. Any of a variety of synchronization techniques can be used to mediate access to the compressed blocks within one or more compressed record files. The system 100 ensures that any processes that modify the files (e.g., by appending or consolidating data) do not interfere with one another. For example, if new records arrive while consolidation is occurring, the system 100 can wait until the consolidation process is finished, or can generate compressed blocks and store them temporarily before appending them to existing compressed record files. Processes that read from a compressed record file can load a portion of the file that is complete, and can ignore any incomplete portion that may be undergoing modification.

The system 100 stores additional data that enables a search for record based on an attribute of the record other than the primary key. A secondary index for a compressed record file includes information that provides one or more primary key values based on a value of an attribute that is designated as a secondary key. Each attribute designated as a secondary key can be associated with a corresponding secondary index. For example, each secondary index can be organized as a table that has rows sorted by the associated secondary key. Each row includes a secondary key value and one or more primary key values of records that include that secondary key value. Thus, if an agent initiates a search for any records that include a given secondary key value, the system 100 looks up the primary key(s) to use for searching the index of the compressed record file for the compressed block(s) that include the record(s). The secondary index may be large (e.g., on the order of the number of records) and in some cases may be stored in the storage medium that stores the compressed record files.

In some cases, the values of an attribute designated as a secondary key may be unique for each record. In such cases, there is a one-to-one correspondence between that secondary key and the primary key, and the interface module 112 can present that secondary key attribute as though it were the primary key to an agent.

Each secondary index can be updated as new compressed record files are appended to a compound compressed record file. Alternatively, a secondary key can be associated with a different secondary index for each compressed record file, and the secondary indices can be consolidated into a single secondary index when the compressed record files are consolidated.

A screening data structure 116 can be associated with a compressed record file for determining the possibility that a record that includes a given attribute value is included in a compressed block of the file. For example, using an overlap encoded signature (OES) as a screening data structure enables the system 100 to determine that a record with a given key value (primary key or secondary key) is definitely not present (a "negative" result), or whether a record with the given key value has the possibility of being present (a "positive" result). For a positive result, the system accesses the appropriate compressed block to either retrieve the record (a "confirmed positive" result), or determine that the record is not present (a "false positive" result). For a negative result, the system can give a negative result to an agent without needing to spend time decompressing and searching the compressed block for a record that is not present. The size of the OES affects how often positive results are false positives, with larger OES size for a given number of distinct (i.e., unique) possible key values yielding fewer false positive results in general. For a given OES size, fewer distinct possible key values yields fewer false positives in general.

Other types of screening data structures are possible. A screening data structure for a given primary or secondary key can be provided for each compressed record file containing a set of compressed blocks. Alternatively, a screening data structure for a key can be provided for each compressed block, or for each of multiple sets of compressed blocks within a compressed record file.

Figure 3A:
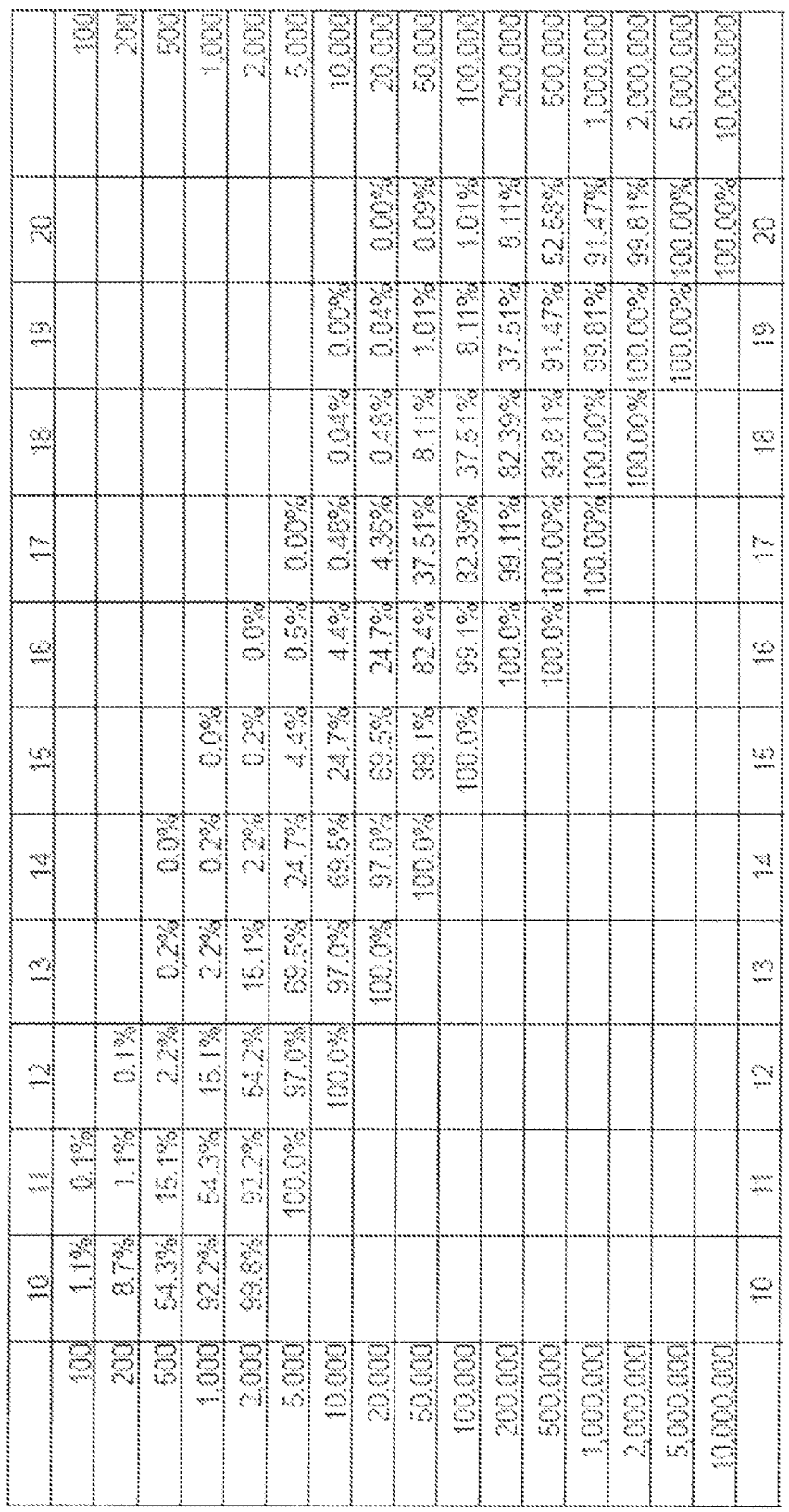
FIGS. 3A and 3B are tables showing false positive probabilities for different signature sizes.
Figure 3B:
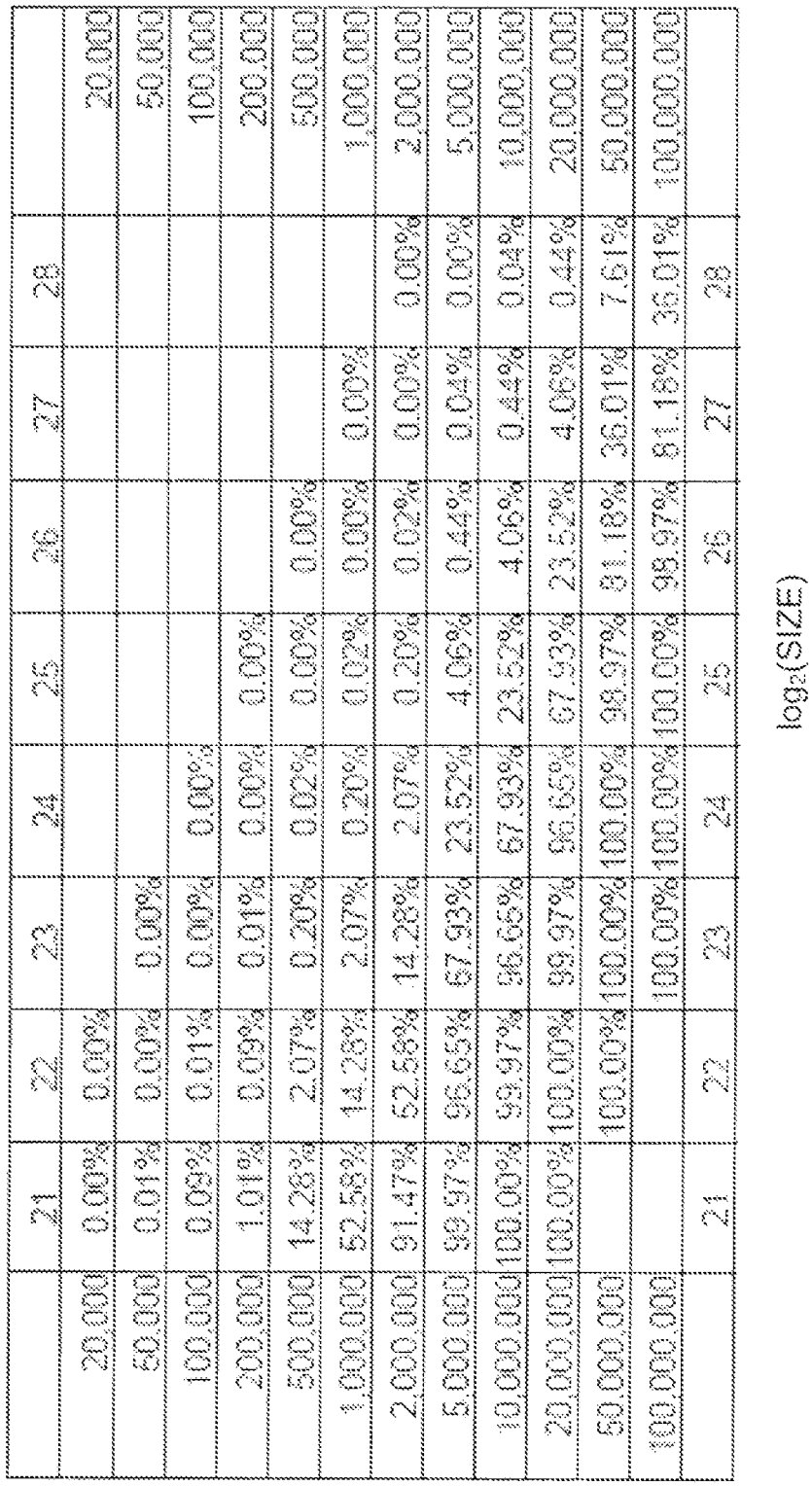

FIGS. 3A and 3B show tables that provide probability values for obtaining a false positive result for a key value for various sizes of an exemplary OES screening data structure (columns) and various numbers of distinct key values represented in the compressed record file (rows). For an OES, depending on the size of the OES and the number of distinct key values, the presence of more than one key value may be indicated in the same portion of the OES, potentially leading to a false positive result for one of those key values if the other is present. The size of this exemplary OES varies from $2^{10}=1024$ bits (in the table of FIG. 3A) to $2^{28}=256$ Mbits (in the table of FIG. 3B). The number of distinct key values varies from 100 (in the table of FIG. 3A) to 100,000,000 (in the table of FIG. 3B). For both tables, the blank cells in the upper right correspond to 0% and the blank cells in the lower left correspond to 100%. For the cells in which the false positive probability is low (e.g., near zero), the screening data structure may be larger than necessary to provide adequate screening. For the cells in which the false positive probability is significant (e.g., >50%), the screening data structure may be too small to provide adequate screening. This example corresponds to a technique for generating an OES using four hash codes per key value. Other examples of OES screening data structures could yield a different table of false positive probabilities for given numbers of distinct keys.

Since the number of distinct key values represented in a compressed record file may not be known, the system 100 can select the size of the screening data structure for the compressed record file based on the number of records from which the file was generated. In selecting the size, there is a trade-off between reducing false positive probabilities and memory space needed to store the screening data structure. One factor in this trade-off the likelihood of searching for absent key values. If most of the key values to be looked up are likely to be present in the decompressed records, the screening data structures may not be needed at all. If there is a significant probability that key values will not be found, then allocating storage space for relatively large screening data structures may save considerable time.

The size of a screening data structures associated with a compressed record file may depend on whether the file corresponds to an initial or consolidated large database of records, or a smaller update to a larger database. A relatively smaller screening data structure size can be used for compressed record files that are appended during regular update intervals since there are generally fewer distinct key values in each update. Also, the small size can reduce the storage space needed as the number of compressed record files grows after many updates. The size of the screening data structure can be based on the expected number of records and/or distinct key values in an update, and on the expected number of updates. For example, if updated files are appended every five minutes through a 24-hour period, there will be 288 compressed record files at the end of the day. The probability of at least one false positive result will be 288 times the appropriate value from the tables of FIGS. 3A and 3B (assuming the results for different updates are independent). After consolidation, a larger screening data structure may be appropriate for the consolidated compressed record file since the number of distinct key values may increase significantly.

A compressed record file can have a screening data structure for the primary key and for each secondary key, or for some subset of the keys. For example, the system 100 may provide a screening data structure for the primary key, and for only those secondary keys that are expected to be used most often in searching for records.

Figure 4A:
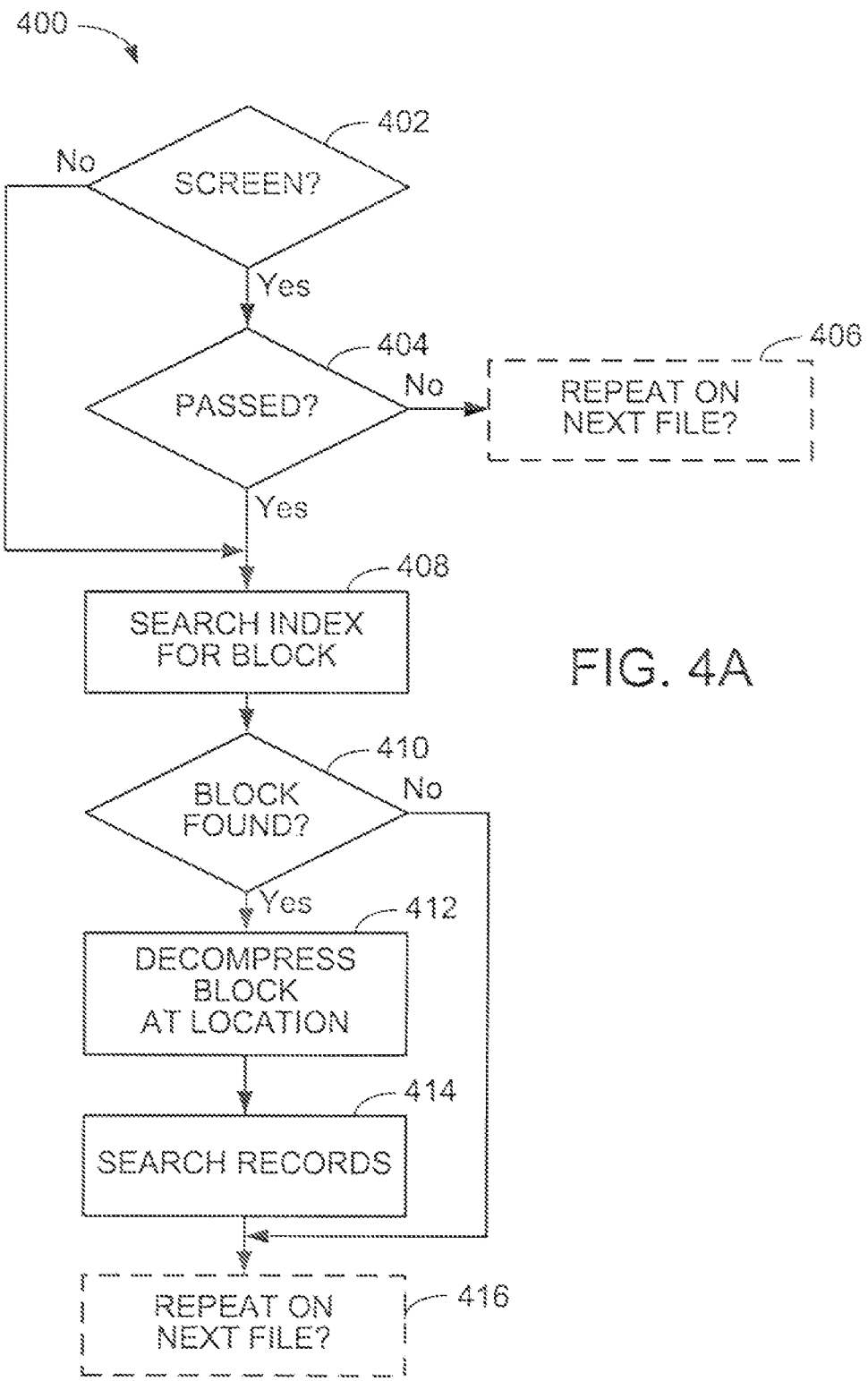
FIGS. 4A and 4B are flowcharts of procedures for searching for records.

FIG. 4A shows a flowchart for a procedure 400 for searching for one or more records with a given primary key value. The procedure 400 determines 402 whether there is a screening data structure associated with a first compressed record file. If so, the procedure 400 processes 404 the screening data structure to obtain either a positive or negative result. If the given primary key value does not pass the screening (a negative result), then the procedure 400 checks 406 for a next compressed record file and repeats on that file if it exists. If the given primary key value does pass the screening (a positive result), then the procedure 400 searches 408 the index for a block that may contain a record with the given primary key value. If no screening data structure is associated with the compressed record file, then the procedure 400 searches 408 the index without performing a screening.

After searching 408 the index, if a compressed block associated with a range of key values that includes the given primary key value is found 410, then the procedure 400 decompresses 412 the block at the location identified by the index entry and searches 414 the resulting records for one or more records with the given primary key value. The procedure then checks 416 for a next compressed record file and repeats on that file if it exists. If no compressed block is found (e.g., if the given primary key value is smaller than the minimum key value in the first block or greater than the maximum key value in the last block), then the procedure 400 checks 416 for a next compressed record file and repeats on that file if it exists.

Figure 4B:
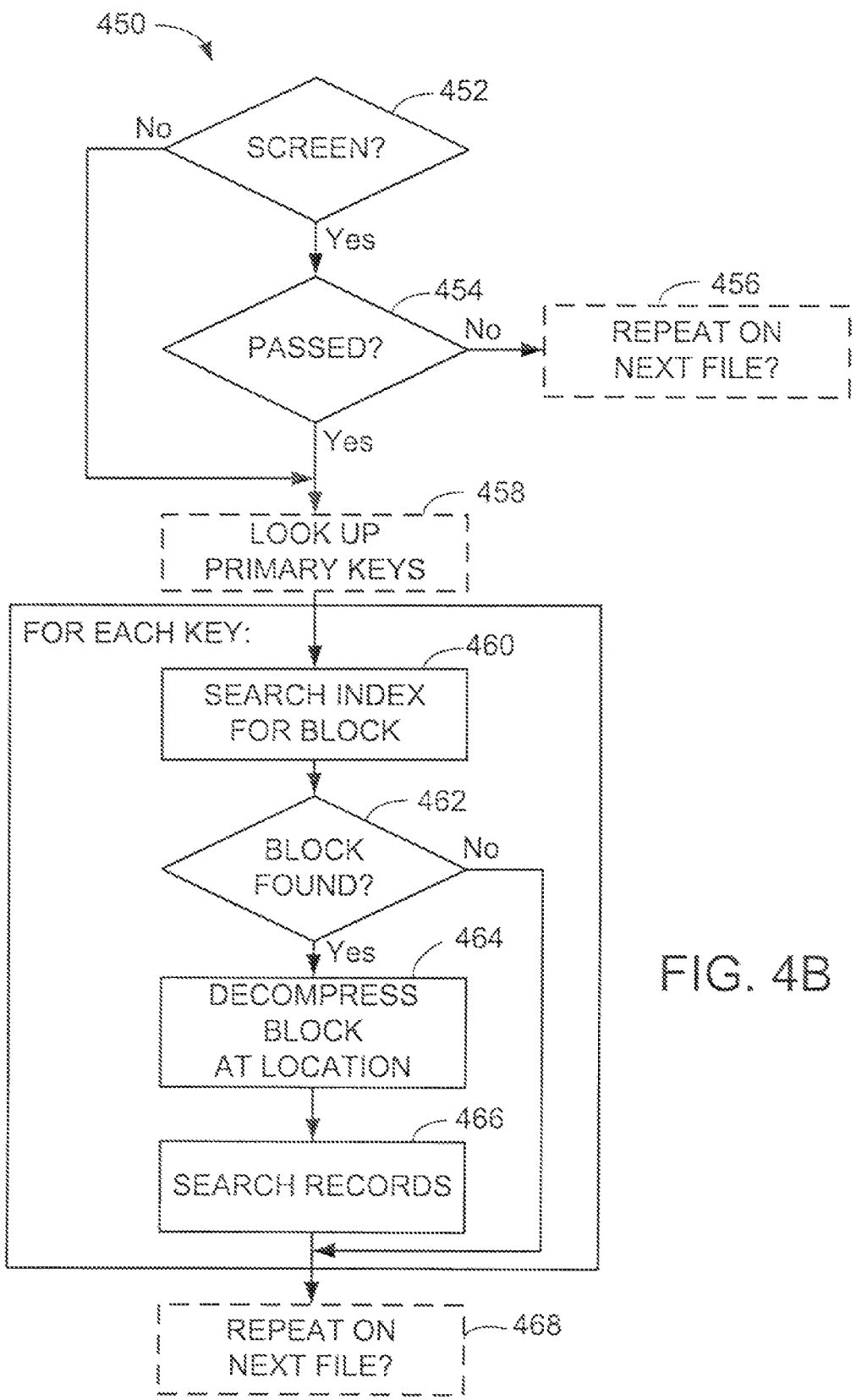

FIG. 4B shows a flowchart for a procedure 450 for searching for one or more records with a given secondary key value. The procedure 450 determines 452 whether there is a screening data structure associated with a first compressed record file. If so, the procedure 450 processes 454 the screening data structure to obtain either a positive or negative result. If the given secondary key value does not pass the screening (a negative result), then the procedure 450 checks 456 for a next compressed record file and repeats on that file if it exists. If the given secondary key value does pass the screening (a positive result), then the procedure 450 looks up 458 the primary keys that correspond to records containing the given secondary key. If no screening data structure is associated with the compressed record file, then the procedure 450 looks up 458 the primary keys without performing a screening.

For each of the primary keys found, the procedure 450 searches 460 the index for a block that may contain a record with the given primary key value. After searching 460 the index, if a compressed block associated with a range of key values that includes the given primary key value is found 462, then the procedure 450 decompresses 464 the block at the location identified by the index entry and searches 466 the resulting records for one or more records with the given primary key value. The procedure then checks 468 for a next compressed record file and repeats on that file if it exists. If no compressed block is found, then the procedure 450 checks 468 for a next compressed record file and repeats on that file if it exists.

Multiple records found with a given primary or secondary key can be returned by procedure 400 or procedure 450 in order of appearance, or in some cases, only the last version of the record is returned.

As described above, the probability of a screening data structure returning a false positive can be measured as a function of the size of the screening data structure (a larger data structure would decrease the probability of false positives) and the number of distinct keys represented in the data structure for identifying a group of records stored in the blocks (a larger number of distinct keys, which tends to increase with the number of blocks for which the screening data structure is used, would increase the probability of false positives). Thus, controlling the size of the screening data structure is one manner in which to affect the probability of false positive results. However, selecting a size that is larger than necessary to achieve an acceptable probability of false positives may use an unnecessarily large amount of scarce storage space. The acceptable probability may be determined, for example, based on a user input.

In some implementations, in order to select the appropriate size of the screening data structure needed for a given group of records, as the records are received, distinct keys associated with those records are accumulated in memory while the records are being received and stored in compressed blocks. Based on this accumulation, the size of the screening data structure needed to achieve a predetermined probability P of false positives can then be determined by counting the number of distinct keys in memory. Then the record processing module 102 generates a screening data of the determined size. So, the screening data structure is not created until after all the records in the group have been received). Thus, the size of the screening data structure can be determined based on the number of accumulated distinct keys, and would not be unnecessarily large to achieve the probability P. However, storing the keys in memory uses system resources (e.g., volatile memory) that may be relatively limited in some systems. While the keys can also be stored in more abundant storage (e.g., non-volatile memory), this technique would increase the input/output (I/O) costs of accessing the stored keys. In some implementations, one or more screening data structures can be generated adaptively while the records in the group are being received to limit the rate of false positives without needing to wait to accumulate an undetermined and/or large number of distinct keys, and without needing to wait until all the records have been received. In this adaptive technique the group of records is received with the records' keys in a sorted order. For example, in some cases the records have natural primary keys that are known to be received by the record processing module 102 already sorted according to those keys. In other cases, the records have synthetic primary keys that are assigned by the record processing module 102 such that they are sorted according to those assigned keys (e.g., keys that are incremented integers, or timestamps, or other monotonically increasing values). If the assigned synthetic keys are also unique, then it is not necessary to store the distinct keys in memory in order to determine how many distinct keys have been received—instead a count of the number of records received can be incremented to determine how many distinct keys have been received.

In some cases, the group of records corresponds to a single batch of records to be processed in a batch processing mode. The last record in the batch can be signified by a predetermined token or message, for example. In other cases, the group of records corresponds to one of multiple delimited sections of a continuous stream that are separated by repeating delimiters. Between any successive pair of delimiters, the group of records is sorted according to the keys, as described above.

Instead of needing to wait until after all of the records in the group have been received to generate a screening data structure for the group, the record processing module 102 can start generating a screening data structure of a predetermined size S as the records are being received. Once the size is determined, the screening data structure can be built as records arrive, for example, by setting bits of a bit map. As the number of distinct keys associated with the screening data structure grows (and the number of bits that are set grows), the probability of false positives also grows. If the end of the group is reached before the probability of false positives reaches P, the size of the screening data structure can be reduced, if necessary, to achieve a probability of false positives closer to P, based on the actual number of distinct keys. If the probability of false positives reaches P (based on the number of distinct keys so far), then the first screening data structure can be stored and a second screening data structure of size S can start to be generated. Any distinct keys stored in memory can be discarded to make room to accumulate new distinct keys associated with the next records received. This process can continue until the last record in the group is received. For a given group of records, there will be one or more screening data structures, each with a size selected to achieve a predetermined probability of false positives (e.g., equal to or close to P), and each built without needing to accumulate an arbitrarily large number of distinct keys or to wait until the last record has been received. Because the records in the group are received in sorted order by their keys, each screening data structure for the group (if there are multiple screening data structures) corresponds to a different non-overlapping range of key values.

The size S can be selected based on any of a variety of factors, such as characteristics of the system 100. For example, the size S can be based on a maximum size that can be efficiently accessed in that system. In some implementations, a hash value of a predetermined size (e.g., a 32-bit hash) is generated from the primary key, and the size S can be selected based on this predetermined hash value size.

In some implementations, two (or more) screening data structures can be built in parallel. For example, one of size S can be built (e.g., with a number of distinct keys K achieving the probability P), and one of size S/2 can be built (e.g., with a number of distinct keys K/2 achieving the probability P). Based on the actual number of distinct keys of the records in the group, one of the data structures can be selected (and reduced if necessary to the appropriate size) and the other data structure can be discarded. For example, if the number of distinct keys is less than or equal to K/2, then the screening data structure of size S/2 can be used, and reduced if necessary to achieve the probability P. If the number of distinct keys is between K and K/2, then the screening data structure of size S can be used, and reduced if necessary to achieve the probability P. If the number of distinct keys passes K, then the screening data structure of size S can be stored and a second screening data structure can be built (and can be built using the same parallel technique). The cost of building the second data structure in parallel may be less than the savings achieved by being closer to the optimum size needed to achieve the desired probability P for the actual number of distinct keys.

In some implementations, the time to adaptively generate screening data structures can be further reduced for a case in which the number of records (and therefore the number of distinct keys) is small. Starting with a screening data structure size of S/2 and then reducing it down to the appropriate size based on the number of distinct keys may be relatively slow in some cases due to the number of operations required to perform the reduction (e.g., using a "fold" operation, reducing from a size of $2^{16}$ bits to a size of $2^{10}$ bits can be achieved using 6 folds). Instead of generating multiple screening data structures in parallel as the records are being received, keys can be accumulated in an in-memory key buffer until the key buffer becomes full or until there are no more records in the group. If the key buffer becomes full, the buffered keys can be used to build the appropriate size screening data structure (e.g., of size S). The key buffer can then be discarded and the keys of all the subsequent records in the group can then be used to generate another screening data structure as those records are being received. If all the records in the group are received before the key buffer becomes full, a screening data structure of appropriate size can be generated from buffered keys, avoiding any reduction operations that would otherwise be required in that case (of a small number of distinct keys).

The following is an example of generating a screening data structure that is a bitmap for which the maximum size S is $2^{16}$ bits (or 8 Kbytes), which corresponds to a given target false positive probability for an assumed number of distinct keys. In this example, a 16 bit address is sufficient to address every bit in the bitmap. As the incoming record are received their keys are hashed to generate 32 bit hash values. The least significant 16 bits of this hash is used to determine the location of the bit in the bitmap that is set for the corresponding key. After all records in the group have been received, if the optimal bitmap size is $2^{10}$ bits, for example, based on the number of distinct keys, then the bitmap can be reduced from $2^{16}$ bits to $2^{10}$ bits. If the bitmap of size $2^{16}$ is split into two parts of equal size, there are two bitmaps each of size $2^{15}$ bits. Combining each bit of the two bitmaps together using a logical "OR" operation produces a folded bitmap of size $2^{15}$ bits. This is one fold operation. Repeating this fold operation another five times (for six fold operations in all) gives a bitmap of size $2^{10}$ bits, which can be addressed using the least significant 10 bits of the 32 bit hash values. The bitmap of size $2^{10}$ bits has a higher false positive rate than the bitmap of $2^{16}$ bits. However since fewer distinct keys were received than the assumed number of distinct keys, the bitmap still achieves the given target false positive probability.

Using this adaptive approach to generating screening data structures, there can be multiple screening data structures, each being used to screen a different subset of the group of records stored in a group of blocks in sorted order by primary key. So, each of the multiple screening data structures is associated with a different corresponding subset of the group of blocks, and with a different range of key values corresponding to the records stored in those blocks. The blocks for all of the records in the group (e.g., stored in a single compressed record file) can be located and searched using an index for determining in which block a given record may be stored. In a "block index search" a single block that may contain a given record can be found (e.g., using a binary search). In some cases, when searching the index, it is not necessary to locate a single block that may contain a given record, but rather it may only be necessary to perform a "block range index search" to determine whether the key of given record falls within a range of key values spanning multiple blocks that are screened by a corresponding one of the screening data structures, as described in more detail below. To facilitate this block range index search, the indexing and search module 108 can store, in association with each screening data structure, an indication of the corresponding range of key values, as described in more detail below.

The procedures 400 and 450 can be used to search for records by checking each of the multiple screening data structures associated with the group of blocks, followed by searching the index to determine which block may contain the record in the case of at least one positive result. However, since a positive result could be a false positive, before locating and decompressing a block to find the record (which is an expensive action to take that could significantly slow the search process if performed unnecessarily), other steps can be taken to catch at least some false positives. For example, a block range index search can be used to determine whether the key of the record falls within the range of key values corresponding to the screening data structure that gave a positive result. If the key value does not fall within that range of key values, then the positive result must have been a false positive. If the key value does fall within that range of key values, then a false positive is not ruled out, and the indexing and search module 108 performs a block index search to find a specific block to decompress and search for a record with the given key.

The consequence of checking each of the multiple screening data structures to search for a record with a given key is that the probability of a false positive is compounded and increases (relative to the false positive probability P of a single screening data structure) with the number of screening data structures searched. For a small number of screening data structures, this may not be significant, but for a large number of screening data structures, performance may improve by first performing a block range index search to identify which of the multiple screening data structures corresponds to a range of key values that includes the given key. Then only the identified screening data structure is checked for a positive result, so the false positive probability is limited to P.

The following example shows how a block range index search can be performed. Each screening data structure is used for screening a different a non-overlapping range of key values of records stored in compressed blocks that are each located by a corresponding index entry.

Since each index entry (except for the last index entry) contains the key value for the first record in the compressed data block located by that index entry, the range of key values screened by a given screening data structure can be determined by identifying a range of index entries associated with the given screening data structure. In the simplified example below, there are two screening data structures labeled "bitmap 0" and "bitmap 1." In this example, the index is stored in an array, and a given index entry can be retrieved using a corresponding sequentially assigned integer value, called an "index entry index" (IEI) to index into the array. The following table shows for each of six index entries in the index, its corresponding IEI value and which bitmap is used to screen the records stored in the block located by that particular index entry. The table ends with a "terminating index entry" that contains the key value for the last record in the compressed data block located by the last normal index entry.

| Bitmap | IEI | Index entry |
| --- | --- | --- |
| 0 | 0 | Key: 10, Offset 0 |
| 0 | 1 | Key: 110, Offset 2000 |
| 0 | 2 | Key: 210, Offset 4000 |
| 1 | 3 | Key: 310, Offset 6000 |
| 1 | 4 | Key: 410, Offset 8000 |
| 1 | 5 | Key: 510, Offset 10000 |
| N/A | 6 | Key: 610, Offset N/A |

Bitmap 0 corresponds to a range of index entries with IEI values from 0 to 2, and bitmap 1 corresponds to a range of index entries with IEI values from 3 to 5. Each index entry contains the key value for the first record in a compressed data block that is located by a stored offset into a file that stores the compressed blocks. In this example, bitmap 0 corresponds to a range of key values from 10 (inclusive) to 310 (exclusive), and bitmap 1 corresponds to a range of key values from 310 (inclusive) to 610 (inclusive). It is sufficient to store a single IEI value in association with each bitmap to indicate the corresponding range of key values for that bitmap, such as the IEI value for the index entry containing the first key value of the range. For example, the IEI value of 0 can be stored in association with bitmap 0, and an IEI value of 3 can be stored in association with bitmap 1. A final IEI value for the terminating index entry can also be stored to indicate the last key value for the last bitmap. The resulting list of screening data structures and corresponding IEI values for this example would be:

| Bitmap | IEI |
|---|---|
| 0 | 0 |
| 1 | 3 |
| N/A | 6 |

An example of using this list, the index, and the bitmaps to search for a record with a key value of 509 is as follows.

1. Block range index search: perform a search (e.g., using a binary search) for the bitmap paired with an IEI for an index entry containing a key value closest to but not larger than 509 across all the key values (10, 310, 610) contained in the index entries identified by the IEI values (0, 3, 6) in the list. This yields the bitmap 1 paired with an IEI of 3 since the corresponding index entry has a key value of 310 and 310<509<610.

2. Perform screening: the key 509 is screened against the screening data structure (bitmap 1) identified in the block range index search.

3a. If the screening yields a positive result: perform a block index search. Perform a search (e.g., using a binary search) for an index entry containing a key value closest to but not larger than 509 across all the key values (310, 410, 510, 610) contained in the index entries associated with the screening data structure. This yields the index entry containing the key value 410 since 410<509<510. This means that a matching record with the key value 509 may be stored in the compressed block located by the index entry at an offset of 8000. The compressed block is decompressed to search for a matching record and return it if it is found.

3b. If the screening yields a negative result: there is no need to perform a block index search since a record with a key value of 509 is not stored in any of the three blocks associated with bitmap 1.

Figure 5:
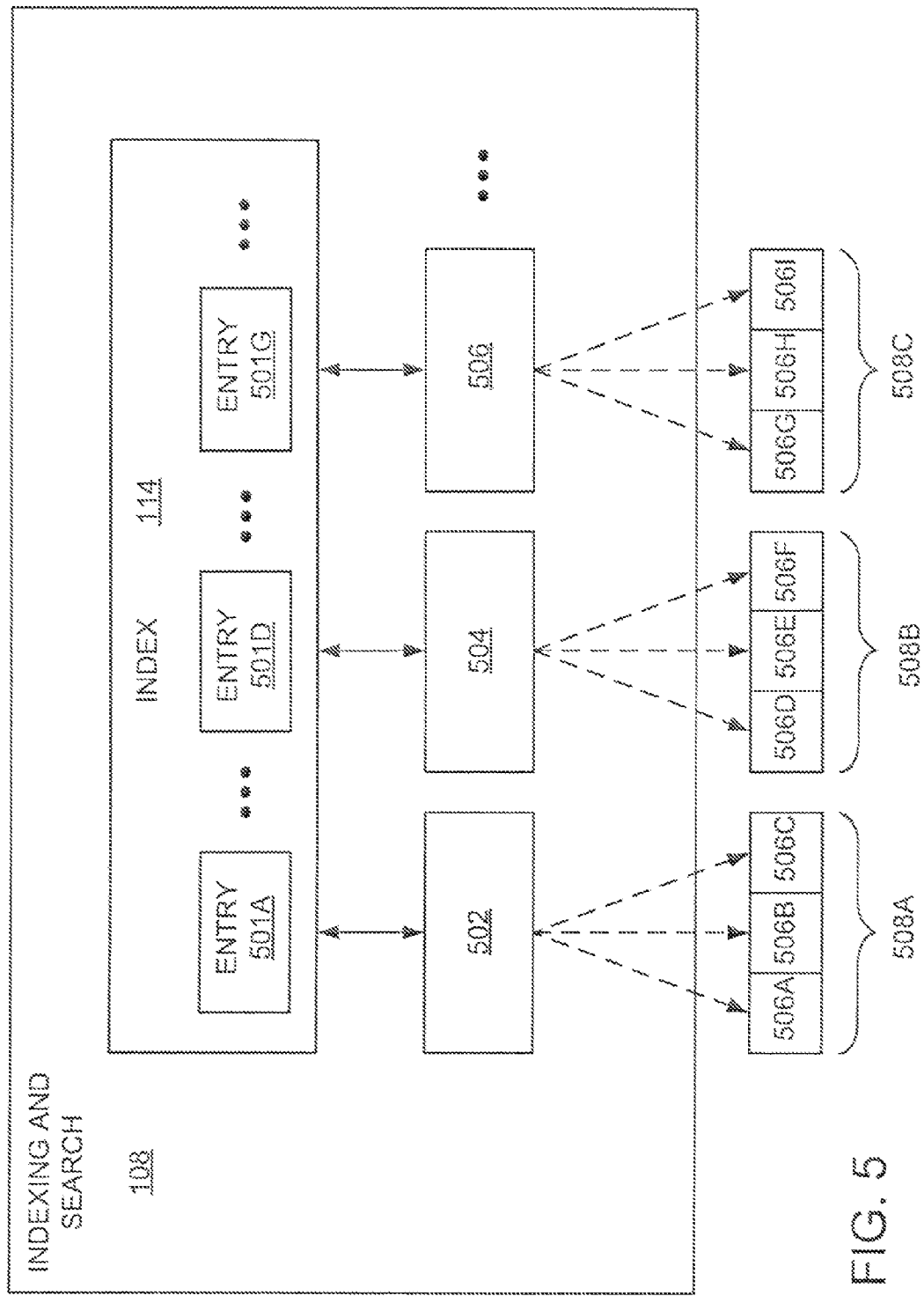
FIG. 5 is a block diagram of an indexing and search module.

FIG. 5 shows an exemplary implementation of an indexing and search module 108, which includes an index 114 for a group of received records, and a number of associated screening structures 502, 504, and 506, etc. adaptively generated as described above. The index 114 contains a series of entries that each include an address of a block from a group of blocks (e.g., blocks 506A-506I) in which the group of received records have been stored, and a key field that identifies the primary key of the first record stored in the block. The records in the blocks are sorted by primary key, as described above. The screening data structures 502, 504, and 506 are each associated with a different respective subset of those blocks (e.g., block sets 508A, 508B, or 508C). In this example, for simplicity, each subset includes three blocks, but a screening data structure is typically associated with a large number of blocks. In some implementations, if the number of screening data structures associated with the group of records is larger than a predetermined threshold (e.g., a threshold of 10 or 100) then the indexing and search module 108 performs a block range index search to identify one of the screening data structures to check. For example, if the module 108 determines that a given key is larger than the key field of an entry 501D indicating the first key stored in the block 506D and smaller than the key field of an entry 501F indicating the first key stored in the block 506g, then the module 108 checks the screening data structure 504 corresponding to the set of blocks 508B. If the screening data structure 504 yields a negative result, a record with the given key is not present in the group of records. If the screening data structure 504 yields a positive result, the index 114 is used to find one of the blocks in the set 508B that may contain the record and the module 108 decompresses the block to search for the record.

In some cases, it is possible that the size of the index 114 could become too large to fit in memory. Some techniques for searching an index (e.g., binary search techniques) result in reading a number of index entries on the order of $\log_2(t)$, where t is the total number of entries in the index. (The actual number of entries read during any given search can be fewer or greater than this amount.) If a significant number of those index entries that are read are not in the portion of the index that happens to be loaded in memory at the time, the time needed to search the index could be significantly increased due to the time needed to load different portions of the index into memory.

In some implementations, the access time associated with searching the index can be reduced by building a hierarchical or "multi-layer" index. In one example of a multi-layer index in which there are two layers of indices, a primary index stored in the index storage 110 (e.g., slower and/or non-volatile storage) contains entries that locate the compressed blocks of records and a secondary index stored in local memory (e.g., faster and/or volatile memory) contains entries used to determine which portion of the primary index is to be loaded into the local memory. To generate such a two-layer index, an initial index containing entries for the compressed blocks is generated with entries sorted by key, as described above. This initial index is the primary index and is divided into contiguous regions of entries that are each small enough to fit entirely within the local memory (e.g., each region is one "disk page" in length. The index entries within each region can optionally be compressed (e.g., into one or more blocks, similar to the blocks described above, but storing index entries instead of records). When compressed, the region will be even smaller, but the size of the region when decompressed should still fit entirely within the local memory. Then, a secondary index is generated that is also small enough to fit entirely within the local memory. Within this secondary index, an entry is created for each of the multiple regions. Each secondary index entry includes an address of a region in the index storage 110 (e.g., an address of a disk page storing the region). Each secondary index entry also includes a key field that identifies the primary key of the first primary index entry stored in the region.

If the secondary index remains small enough to fit within the local memory, access costs (e.g., time needed to perform input/output (I/O) operations) can be reduced. For example, in order to retrieve a desired record, a first search is performed within the secondary index (which is contained within the local memory) in order to determine which region of the primary index contains the entry associated with the block that stores the desired record. Once the appropriate region of the primary index is determined (e.g., using a binary search), that region of the primary index is retrieved from the index storage 110 to the local memory and searched to find the primary index entry that locates block storing the record. Thus, in this example, the first search is performed within the secondary index that fits in local memory, then, after one I/O operation, a subsequent search is performed within a region of the primary index that also fits in local memory. Because the primary index is divided into regions that are one disk page in length, the I/O cost of accessing the index can be reduced. If the secondary index is too large (or becomes too large) to fit entirely within the local memory, then a third layer of the multilayer index can be generated (and a fourth layer, and so on) such that the highest layer fits entirely within the local memory and each lower layer is divided into regions that each fit entirely within the local memory. The lowest layer is the primary index that stores the compressed blocks of records.

The record storage and retrieval techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for managing data, a method including:
receiving at least one group of individually accessible data units over an input device or port, each data unit identified by a key value, with key values of received data units being determined such that the key value identifying a given first data unit that is received before a given second data unit occurs earlier in a sort order than the key value identifying the given second data unit; and
processing, by at least one processor, the received data units for storage in a data storage system, the processing including
storing a plurality of blocks of data, one or more of the blocks being generated by combining a plurality of the received data units;
providing an index that includes an entry for each of the blocks, wherein one or more of the entries enable location, based on a provided key value, of a block that includes a data unit corresponding to the provided key value; and
generating one or more screening data structures associated with the stored blocks for determining, based on a given key value and one or more of the screening data structures, whether to search the stored blocks for a data unit that corresponds to the given key value.

2. A method of claim 1, wherein generating one or more screening data structures includes generating a plurality of screening data structures including a first screening data structure for screening a first set of one or more blocks and a second screening data structure for screening a second set of one or more blocks.

3. A method of claim 2, wherein each of the plurality of screening data structures corresponds to a different non-overlapping range of key values identifying data units stored in a corresponding set of one or more blocks.

4. A method of claim 2, wherein the first screening data structure is generated after accumulating a predetermined number of distinct key values of a first set of data units stored in the first set of one or more blocks, and the second screening data structure is generated while receiving a second set of data units stored in the second set of one or more blocks.

5. A method of claim 2, further including searching for a data unit with a given key value using the index and the plurality of screening data structures.

6. A method of claim 1, wherein generating one or more screening data structures includes generating a single screening data structure for screening all of the blocks storing the data units in the group of individually accessible data units after determining that there are fewer than a predetermined number of distinct keys of the data units in the group of individually accessible data units.

7. A method of claim 6, wherein the single screening data structure is generated from a selected one of multiple screening data structures generated in parallel while receiving at least some of the data units in the group of individually accessible data units.

8. A method of claim 1, wherein a given screening data structure determines, for a given key value, either that a data unit including the given key value was definitely not included, or that a data unit including the given key value was possibly included.

9. A method of claim 8, further including selecting the size of the given screening data structure based on the number of distinct key values identifying the data units from which the blocks were generated.

10. A method of claim 1, wherein a key value that identifies a given data unit corresponds to one or more fields associated with the given data unit before the given data unit is received over the input device or port.

11. A method of claim 1, wherein a key value that identifies a given data unit is assigned to the given data unit after the given data unit is received over the input device or port.

12. A method of claim 1, wherein the number of screening data structures associated with the stored blocks is determined based on the number of distinct key values identifying the data units in the group of individually accessible data units and a target false positive probability associated with the screening data structures.

13. A method of claim 1, wherein the index is a hierarchical index including at least a first level of the index and a second level of the index.

14. A method of claim 13, wherein the first level of the index is divided into multiple regions of the entries that enable location, based on a provided key value, of a block that includes data units corresponding to a range of key values that includes the provided key value, with each region being small enough to fit entirely within a memory coupled to the data storage system.

15. A method of claim 14, wherein one or more of the entries in the second level of the index enable location, based on a provided key value, of a region of the first level of the index that includes entries corresponding to a range of key values that includes the provided key value.

16. A non-transitory computer-readable medium storing a computer program for managing data, the computer program including instructions for causing a computer to:
receive at least one group of individually accessible data units over an input device or port, each data unit identified by a key value, with key values of received data units being determined such that the key value identifying a given first data unit that is received before a given second data unit occurs earlier in a sort order than the key value identifying the given second data unit; and
process the received data units for storage in a data storage system, the processing including
storing a plurality of blocks of data, one or more of the blocks being generated by combining a plurality of the received data units;
providing an index that includes an entry for each of the blocks, wherein one or more of the entries enable location, based on a provided key value, of a block that includes a data unit corresponding to the provided key value; and
generating one or more screening data structures associated with the stored blocks for determining, based on a given key value and one or more of the screening data structures, whether to search the stored blocks for a data unit that corresponds to the given key value.

17. The computer-readable medium of claim 16, wherein generating one or more screening data structures includes generating a plurality of screening data structures including a first screening data structure for screening a first set of one or more blocks and a second screening data structure for screening a second set of one or more blocks.

18. The computer-readable medium of claim 17, wherein each of the plurality of screening data structures corresponds to a different non-overlapping range of key values identifying data units stored in a corresponding set of one or more blocks.

19. The computer-readable medium of claim 17, wherein the first screening data structure is generated after accumulating a predetermined number of distinct key values of a first set of data units stored in the first set of one or more blocks, and the second screening data structure is generated while receiving a second set of data units stored in the second set of one or more blocks.

20. The computer-readable medium of claim 17, wherein the instructions further cause the computer to search for a data unit with a given key value using the index and the plurality of screening data structures.

21. The computer-readable medium of claim 16, wherein generating one or more screening data structures includes generating a single screening data structure for screening all of the blocks storing the data units in the group of individually accessible data units after determining that there are fewer than a predetermined number of distinct keys of the data units in the group of individually accessible data units.

22. The computer-readable medium of claim 21, wherein the single screening data structure is generated from a selected one of multiple screening data structures generated in parallel while receiving at least some of the data units in the group of individually accessible data units.

23. The computer-readable medium of claim 16, wherein a given screening data structure determines, for a given key value, either that a data unit including the given key value was definitely not included, or that a data unit including the given key value was possibly included.

24. The computer-readable medium of claim 23, wherein the instructions further cause the computer to select the size of the given screening data structure based on the number of distinct key values identifying the data units from which the blocks were generated.

25. The computer-readable medium of claim 16, wherein a key value that identifies a given data unit corresponds to one or more fields associated with the given data unit before the given data unit is received over the input device or port.

26. The computer-readable medium of claim 16, wherein a key value that identifies a given data unit is assigned to the given data unit after the given data unit is received over the input device or port.

27. The computer-readable medium of claim 16, wherein the number of screening data structures associated with the stored blocks is determined based on the number of distinct key values identifying the data units in the group of individually accessible data units and a target false positive probability associated with the screening data structures.

28. The computer-readable medium of claim 16, wherein the index is a hierarchical index including at least a first level of the index and a second level of the index.

29. The computer-readable medium of claim 28, wherein the first level of the index is divided into multiple regions of the entries that enable location, based on a provided key value, of a block that includes data units corresponding to a range of key values that includes the provided key value, with each region being small enough to fit entirely within a memory coupled to the data storage system.

30. The computer-readable medium of claim 29, wherein one or more of the entries in the second level of the index enable location, based on a provided key value, of a region of the first level of the index that includes entries corresponding to a range of key values that includes the provided key value.

31. A system for managing data, the system including:
an input device or port configured to receive at least one group of individually accessible data units, each data unit identified by a key value, with key values of received data units being determined such that the key value identifying a given first data unit that is received before a given second data unit occurs earlier in a sort order than the key value identifying the given second data unit; and at least one processor configured to process the received data units for storage in a data storage system, the processing including storing a plurality of blocks of data, one or more of the blocks being generated by combining a plurality of the received data units;

providing an index that includes an entry for each of the blocks, wherein one or more of the entries enable location, based on a provided key value, of a block that includes a data unit corresponding to the provided key value; and generating one or more screening data structures associated with the stored blocks for determining, based on a given key value and one or more of the screening data structures, whether to search the stored blocks for a data unit that correspond to the given key value.

32. The system of claim 31, wherein generating one or more screening data structures includes generating a plurality of screening data structures including a first screening data structure for screening a first set of one or more blocks and a second screening data structure for screening a second set of one or more blocks.

33. The system of claim 32, wherein each of the plurality of screening data structures corresponds to a different non-overlapping range of key values identifying data units stored in a corresponding set of one or more blocks.

34. The system of claim 32, wherein the first screening data structure is generated after accumulating a predetermined number of distinct key values of a first set of data units stored in the first set of one or more blocks, and the second screening data structure is generated while receiving a second set of data units stored in the second set of one or more blocks.

35. The system of claim 32, the processing further including searching for a data unit with a given key value using the index and the plurality of screening data structures.

36. The system of claim 31, wherein generating one or more screening data structures includes generating a single screening data structure for screening all of the blocks storing the data units in the group of individually accessible data units after determining that there are fewer than a predetermined number of distinct keys of the data units in the group of individually accessible data units.

37. The system of claim 36, wherein the single screening data structure is generated from a selected one of multiple screening data structures generated in parallel while receiving at least some of the data units in the group of individually accessible data units.

38. The system of claim 31, wherein a given screening data structure determines, for a given key value, either that a data unit including the given key value was definitely not included, or that a data unit including the given key value was possibly included.

39. The system of claim 38, the processing further including selecting the size of the given screening data structure based on the number of distinct key values identifying the data units from which the blocks were generated.

40. The system of claim 31, wherein a key value that identifies a given data unit corresponds to one or more fields associated with the given data unit before the given data unit is received over the input device or port.

41. The system of claim 31, wherein a key value that identifies a given data unit is assigned to the given data unit after the given data unit is received over the input device or port.

42. The system of claim 31, wherein the number of screening data structures associated with the stored blocks is determined based on the number of distinct key values identifying the data units in the group of individually accessible data units and a target false positive probability associated with the screening data structures.

43. The system of claim 31, wherein the index is a hierarchical index including at least a first level of the index and a second level of the index.

44. The system of claim 43, wherein the first level of the index is divided into multiple regions of the entries that enable location, based on a provided key value, of a block that includes data units corresponding to a range of key values that includes the provided key value, with each region being small enough to fit entirely within a memory coupled to the data storage system.

45. The system of claim 44, wherein one or more of the entries in the second level of the index enable location, based on a provided key value, of a region of the first level of the index that includes entries corresponding to a range of key values that includes the provided key value.

* * * * *

UNITED STATES PATENT AND TRADEMARK OFFICE
CERTIFICATE OF CORRECTION

PATENT NO. : 8,489,553 B2
APPLICATION NO. : 13/540125
DATED : July 16, 2013
INVENTOR(S) : Vrishal Kulkarni et al.

It is certified that error appears in the above-identified patent and that said Letters Patent is hereby corrected as shown below:

Title Page 2, Col. 2 item (56), (Other Publications), Line 13, Delete "Proceeding," and insert -- Proceedings, --

In the Claims:

Column 20, Line 4, In Claim 1, Delete "a" and insert -- the --

Signed and Sealed this
Eighth Day of October, 2013

Teresa Stanek Rea
*Deputy Director of the United States Patent and Trademark Office*